July 5, 1966 P. HEDGEWICK ETAL 3,258,840
METHOD OF MAKING A CORE FOR MOLDING REFLECTORS
Filed Dec. 5, 1963 5 Sheets-Sheet 1
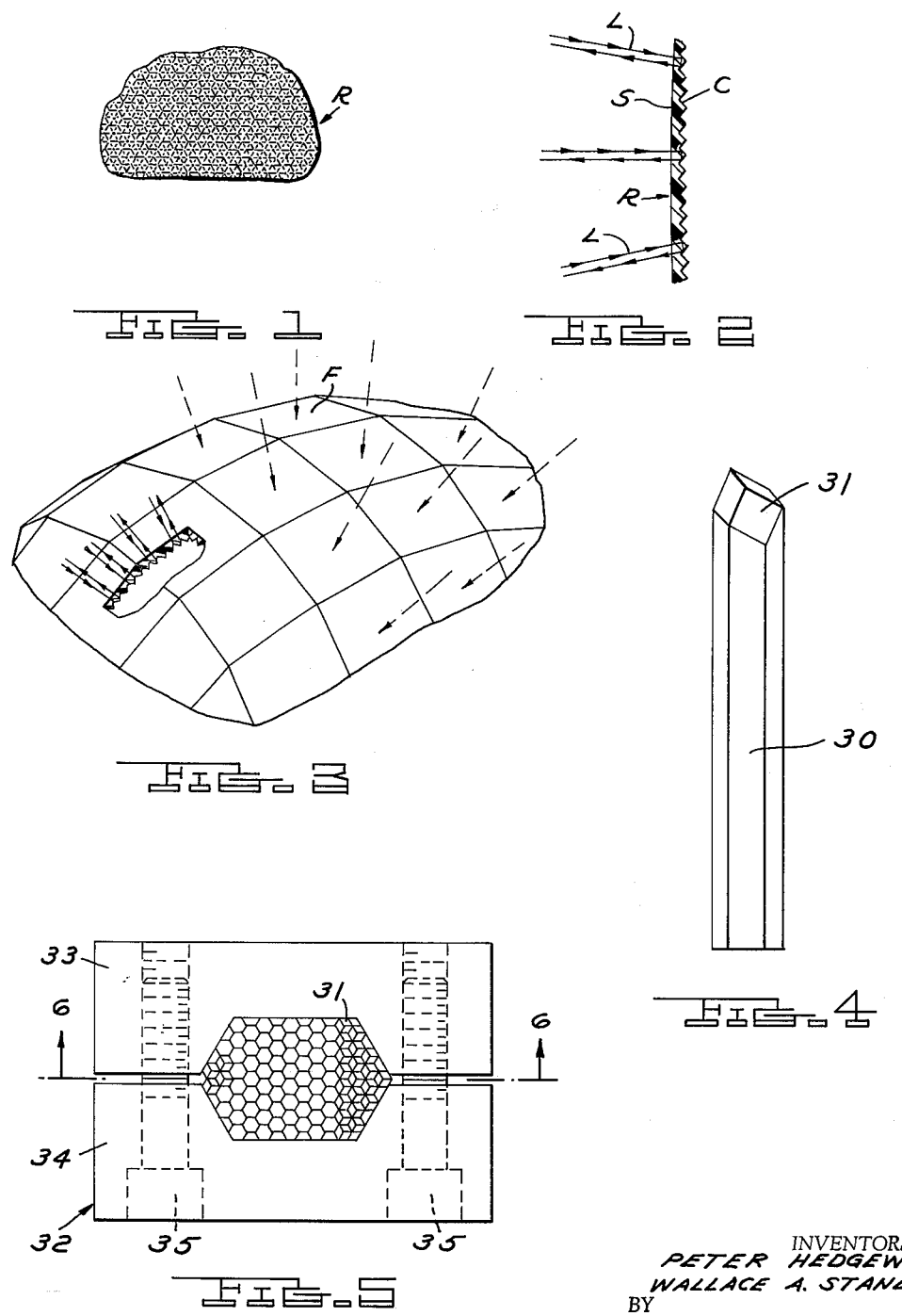
INVENTORS
PETER HEDGEWICK
WALLACE A. STANLEY
BY
Barnes, Kisselle, Raisch & Choate
ATTORNEYS

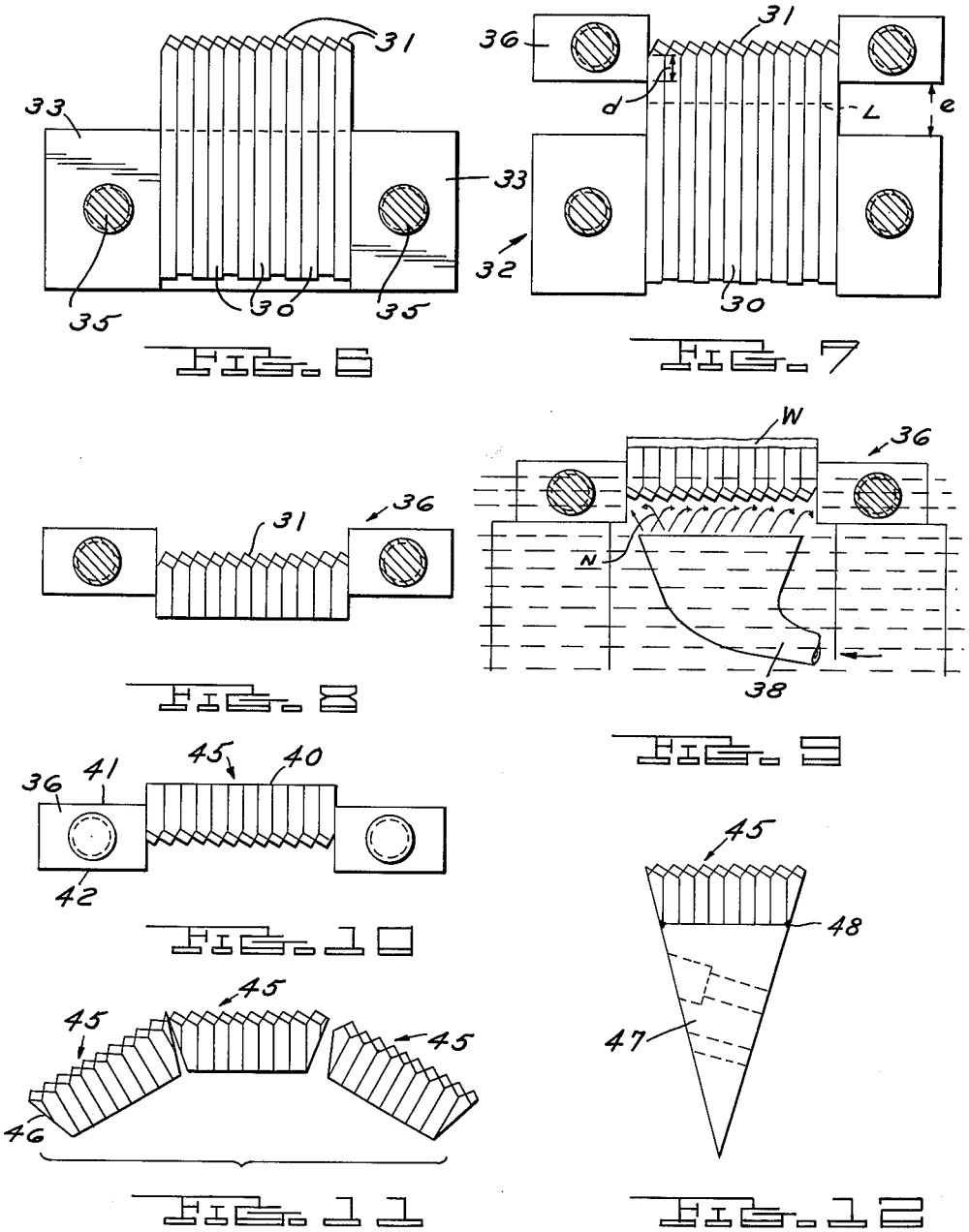

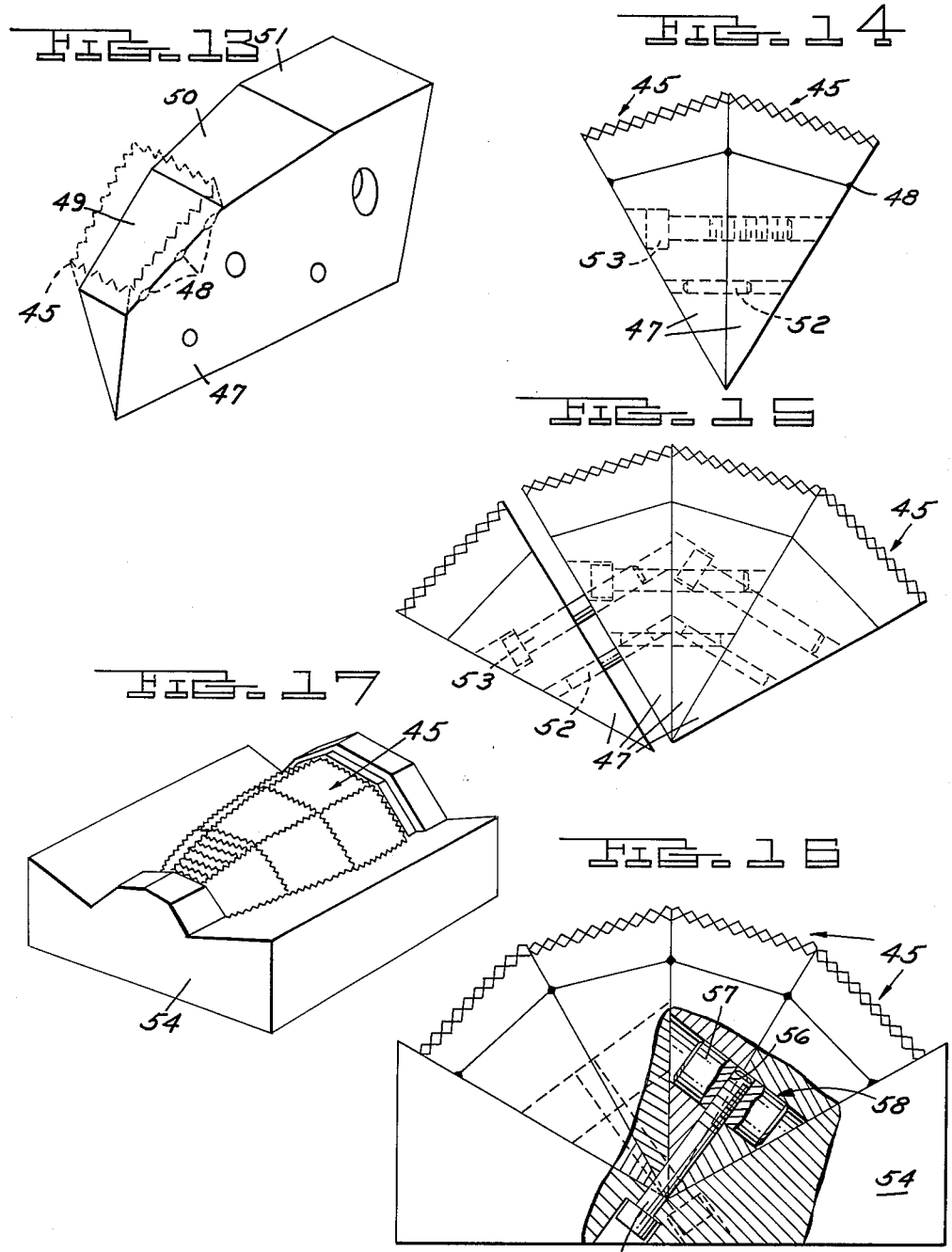

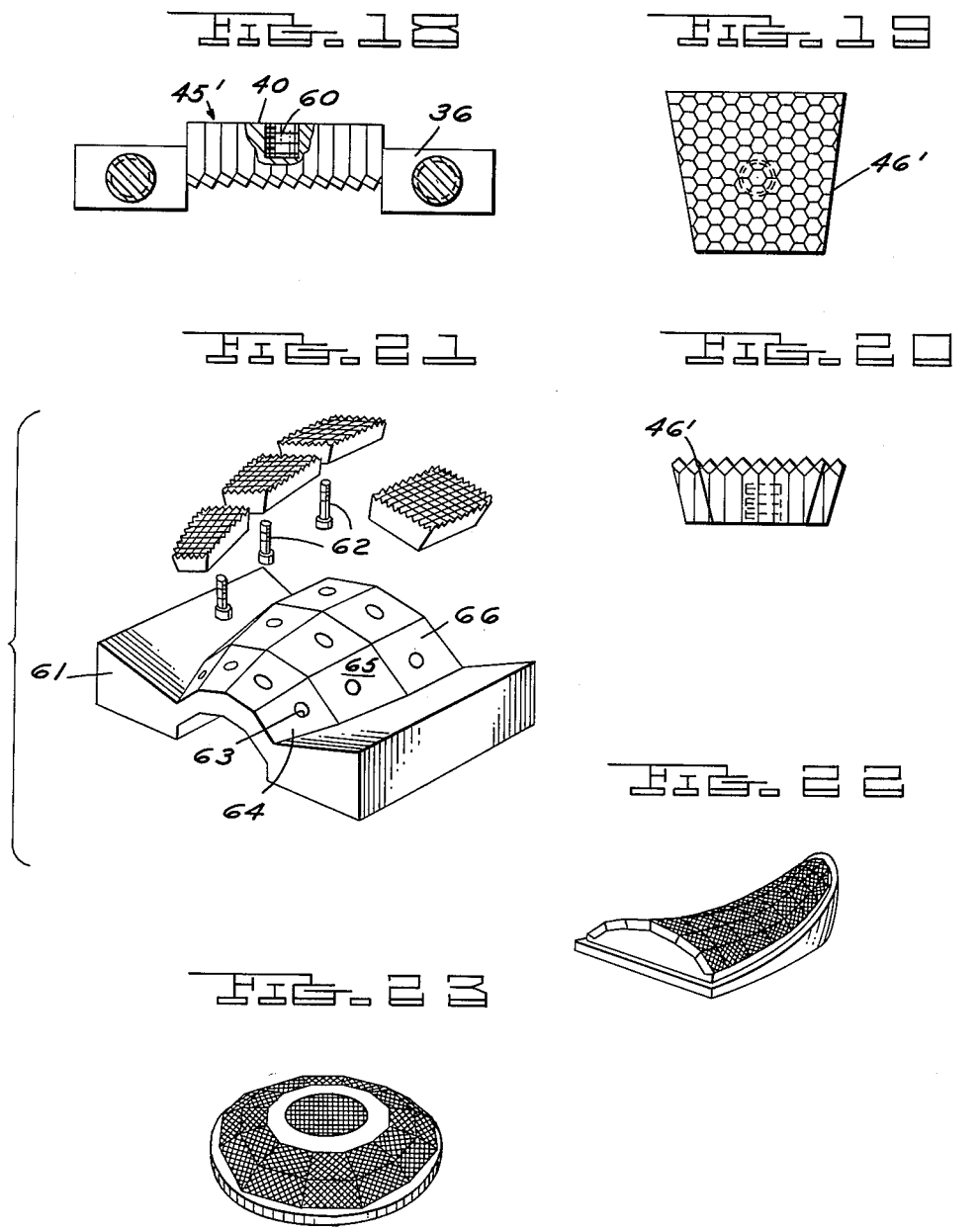

July 5, 1966 P. HEDGEWICK ET AL 3,258,840
METHOD OF MAKING A CORE FOR MOLDING REFLECTORS
Filed Dec. 5, 1963 5 Sheets-Sheet 5

INVENTORS
PETER HEDGEWICK
WALLACE A. STANLEY
BY
Barnes, Kisselle, Raisch & Choate
ATTORNEYS

United States Patent Office 3,258,840
Patented July 5, 1966

3,258,840
METHOD OF MAKING A CORE FOR MOLDING REFLECTORS
Peter Hedgewick, 2375 Windermere Road, Windsor, Ontario, Canada, and Wallace A. Stanley, 7224 Old Mill Road, Birmingham, Mich.
Filed Dec. 5, 1963, Ser. No. 328,333
17 Claims. (Cl. 29—471.1)

This invention relates to reflecting devices and particularly to reflectors for use on automotive vehicles, along highways, airfield strips, and the like.

The invention particularly relates to reflectors of the type used on automotive vehicles which are formed from plastic or glass and produce a reflective brilliance designated as Class A and Class B in accordance with the standards of Society of Automotive Engineers designated SAE J594a.

The generally accepted method of making such reflectors is by injecting a charge of molten material, such as plastic, between a core and a mold consisting of a cluster of oriented hexagonal rods having ends shaped preferably in the form of a cube. The brilliance of the resultant reflector depends upon the accuracy with which the cubed ends of the rods in the cluster are formed. In order to maintain the high accuracy of these surfaces, which is on the order of 5½ millionths of an inch to produce a brilliance of the Class A type, it has been heretofore necessary to clamp the accurately formed rods and maintain the rods in the clamp during the molding. It has been found that if attempts were made to reproduce the molding surface from the clamped rods as by an electro-formed reproduction, the optical quality and finish of the electro-formed cores has been substantially reduced, resulting in a substantial loss of brilliance and reflectivity.

The necessity for maintaining the rods in clamped relationship by means of a mechanical clamp has seriously limited the design of the reflectors that can be made. It therefore has not been possible to make reflectors of Class A or Class B brilliance which had multiple facets, that is, multiple reflecting surfaces at a plurality of angles. This has been due to the interference of the clamps of adjacent clusters. As a result, the reflectors that have been made with the desired degree of brilliance have a very limited area or cone of reflectivity.

It is therefore an object of this invention to provide a method of making a core for molding a reflector which has multiple facets and therefore a greater angle of reflectivity and at the same time has the high degree of reflective brilliance.

It is a further object of the invention to provide such a method including novel steps for making the core or mold units utilized in making the reflector.

In the drawings:

FIG. 1 is a fragmentary plan view of a reflector surface utilized in the invention.

FIG. 2 is a fragmentary partly diagrammatic sectional view through the reflector in FIG. 1.

FIG. 3 is a fragmentary partly diagrammatic perspective view of a reflector embodying the invention.

FIG. 4 is a perspective view of a rod utilized in the invention.

FIG. 5 is a plan view of an apparatus utilized in the invention.

FIG. 6 is a sectional view taken along the line 6—6 in FIG. 5.

FIGS. 7–10 show the apparatus and various steps in the method of forming the molding unit.

FIG. 11 is a partly diagrammatic view showing the manner in which the core units are combined to form a core sub-assembly.

FIG. 12 is an end elevation of a core sub-assembly.

FIG. 13 is a perspective view of the core sub-assembly shown in FIG. 12.

FIG. 14 is an end view of further assembly of the core sub-assemblies shown in FIGS. 12 and 13.

FIG. 15 is a further sub-assembly.

FIG. 16 is an end view of a core assembly.

FIG. 17 is an exploded perspective view of the unit shown in FIG. 16.

FIG. 18 is a view of the apparatus utilized in a modified step in the method of making core units.

FIG. 19 is a plan view of the core unit made by the apparatus in FIG. 18.

FIG. 20 is an end view of the core unit shown in FIG. 19.

FIG. 21 is an exploded perspective view showing the manner in which the core units shown in FIGS. 19 and 20 are assembled to form a core assembly.

FIGS. 22, 23 and 24 are perspective views of rod core assemblies for molds to produce reflectors embodying the invention.

Figure 24:
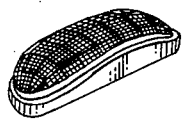

The type of reflector to which the invention relates embodies a reflecting surface such as shown in FIGS. 1 and 2. Referring to FIGS. 1 and 2, the plastic or glass reflector R comprises a smooth or otherwise shaped outer surface S and an accurately formed inner surface forming reflecting surfaces that preferably intersect at 90 degree angles in the form of cubic corners or prisms C. Such reflectors are commonly called retrodirective types, since the light rays from an external source are redirected by reflections from the surfaces of the prisms C back to the exterior, as shown by the light rays in FIG. 2. Reflectors of this type are of particular use in automotive vehicles, along highways and airfield landing strips to reflect back to an approaching vehicle or airplane the light rays projected from a light and thereby serve as a guide or danger signal. The reflectors themselves may have light sources positioned behind the prisms C.

Heretofore, accurate surfaces on such reflectors have been only possible by assembling a plurality of accurately formed hexagonal rods 30 (FIG. 4) into a bundle or unit by physically clamping the rods and maintaining them clamped during the molding operation. The ends of the rods have accurately formed cubic corners 31 thereon against which the molten plastic material is pressed to form the prisms C. Because of the interference of the physical clamps that clamp the adjacent bundles or groups of rods 30, it has not heretofore been possible to produce a reflector such as shown in FIG. 3 having a plurality of facets F at angles to one another and thereby provide a reflector which has a wide angle of reflectivity. Heretofore, it has only been possible to produce a reflector such as shown in FIG. 3 by an electro-form core unit, which does not have a molding surface sufficiently accurate to produce the required degree of brilliance.

In accordance with the present invention, a reflector such as shown in FIG. 3 is produced by forming a plurality of bundles or groups or rods 30 which need not be maintained in clamped assembly by physical clamps. These groups of rods, hereinafter referred to as unitary rod or core units, are fixed to a core block in adjacent abutting relation to one another to form the core assembly that is used in producing the multi-faceted reflector.

In accordance with the invention, the unitary core units are made in such a manner that the accuracy of the shaped or cubed ends of the rods is maintained undisturbed and, as a result, the reflector that is made has the required high degree of brilliance.

The method of assembling the rod units in a unitary core may be better understood by reference to FIGS. 5–10. A plurality of accurately formed rods 30 which are generally hexagonal in cross section and have cubed ends 31 are assembled in a bundle with the cubed ends 31 formed into the desired molding surface which may be either planar or curved. The bundle of rods is then clamped tightly by means of a clamp 32 adjacent the ends of rods 30 which are opposite the cubed ends 31. Clamp 32 comprises clamp elements 33, 34 held together by bolts 35.

Each rod 30 has a length preferably of 1¾ to 1⅞ inches and the cubed ends 31 are formed and finished to high optical quality standards on the order of 5½ millionths of an inch.

The completely oriented cluster or bundle of rods, after being clamped tightly by clamp 32, is then clamped adjacent its cube ends 31 tightly by another clamp 36. In the case of the rods having the lengths heretofore mentioned, the distance $d$ is preferably approximately ⅛ inch and the distance $e$ is preferably approximately ⅜ inch (FIG. 7).

As a next step, the clamped cluster of rods is severed in the area between the clamps 32, 36 along the line L. In the case of the rods having the length heretofore mentioned, line L is preferably about 3/16 inch from the underside of the clamp 36.

This produces a clamped cluster of the shaped cube ends of the rods as shown in FIG. 8. As a next step, the ends opposite the cubed ends are fusion welded as at W in an inert atmosphere formed by inert gas to a fusion depth sufficient to hold the rods in an assembled core unit after the clamps 36 are removed. At the same time, a liquid coolant is applied to the cube ends 31 to maintain the cube ends 31 cooled during the welding. Preferably, the coolant is applied by means of jets of liquid coolant from a jet pipe 38 while the assembled clamp 36 and rods are substantially submerged in liquid coolant (FIG. 9). The fusion welding is performed carefully in order to protect the optical quality of the surfaces 31 of the rods from damage by the heat, oxidation or discoloration.

After the fusion welding, the clamped cluster with the clamp 36 in position is heat treated to relieve all stresses in the rods which may have been introduced by the fusion welding.

Next, the welded surface W is ground to a high degree of accuracy to form an accurately formed bottom surface 40 (FIG. 10). The accuracy of the surface 40 with respect to the axes of the rods is referenced against corresponding accurately formed surfaces 41, 42 on the clamps 36.

After the surface 40 has been obtained the clamp 36 is carefully removed, resulting in a unitary core unit 45 of rods, which is thereafter handled carefully to prevent damage to the cube ends of the rods.

A plurality of the units can then be mounted on a base or block to provide a multi-faceted core assembly.

In accordance with the invention, each core unit 45 preferably has the side surface 46 thereof accurately ground in a gradual taper or negative angle from the cube ends to the opposite ends so that the core units 45 are clamped against a base block, as shown diagrammatically in FIG. 11. The upper ends of the side surfaces 46 abut in tight relationship to one another. This provides an additional clamping pressure transversely across the cube ends of the rods when the core units are assembled in a core assembly. This additional clamping pressure prevents any of the rods from loosening under the forces encountered in molding and also produces a maximum fit at the cluster adjoining surfaces 46, thereby preventing any of the molten material from working into the area between the surfaces 46 under the high molding pressures encountered in use.

One of the methods of assembling the core units 45 to form the core assembly is shown in FIGS. 12–17. As shown in FIGS. 12 and 13, a plurality of core uits 45 are successively mounted on wedge-shaped blocks 47 by tack welding as at 48. The block 47 has surfaces 49, 50, 51 at various angles to one another. During tack welding, the core units 45 are held in tightly adjacent relationship by clamps so that the side surfaces 46 having the negative angle produce a high pressure at the upper corners, as shown in FIG. 11. Each sub-assembly of a wedge block 47 and core units 45 is fixed to another sub-assembly by means of dowel pins 52 and screws 53 extending into the blocks (FIG. 14). Successive blocks 47 are assembled to each sub-assembly of blocks by pins 52 and screws 53 (FIG. 15). Finally, the assembled blocks 47 and core units 45 having the wedge units thereon are mounted on a base 54 by means of screws 55 that extend into threaded openings 56 of pins 57 that are driven into openings 58 in the blocks (FIGS. 16 and 17).

The resultant core assembly can be utilized with a complementary mold to form a cavity into which molten material is injected to form the reflector.

Instead of mounting the core units on a base as shown in FIGS. 12–17, an alternative method may be used such as shown in FIGS. 18–21.

After the accurately formed surface 40 has been provided, as shown in FIG. 10, an opening 60 is drilled and tapped through the surface 40. The end of the opening 60 is then fusion welded in an inert gas atmosphere while liquid coolant is provided to the cube ends of the rods by jets (as in FIG. 9) in order to protect the surfaces from discoloration and damage. The entire clamp structure is then heated in a heat treating enclosure to relieve all stresses from the fusion welding of the end of the opening 60, after which the clamp 36 is removed.

The entire cluster that forms a core unit 45' is carefully unclamped and handled in such a manner as to prevent damage to the cubed ends of the rods. The side surfaces 46' are then formed with a negative angle as in the previous form of core unit and the core units are assembled on a base 61 by means of screws 62 that extend through threaded openings 63 in the base into the threaded opening 60 of the core unit. The base 61 is formed with surfaces 64, 65, 66 at various angles corresponding to the angularity required between the facets of the reflector which was to be molded. During clamping into position, the adjacent faces 46' are brought into position with the upper ends thereof in tightly clamping relations, as shown diagramatically in FIG. 11.

The types of reflectors that can be molded by utilizing core units made in accordance with the invention vary in shape and can be such, for example, as shown in FIGS. 22, 23 and 24, having various curvatures transversely and longitudinally.

Figure 25:
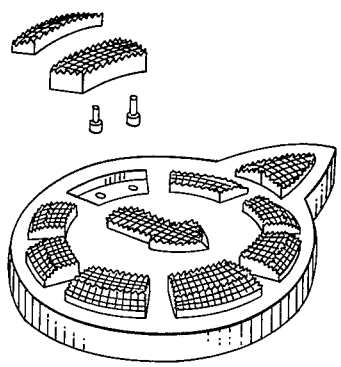
FIG. 25 is an exploded perspective view of a modified core assembly.

The core units made in accordance with the invention have the further advantage in that they can be used to produce a reflector which has spaced reflector portions such as shown in FIG. 25. In other words, the core units may be made of various cross sections or ground after they are made along their side surfaces to various shapes as shown in FIG. 25.

Figure 26:
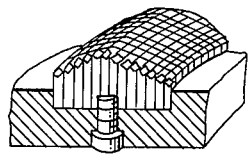
FIG. 26 is a fragmentary perspective view of a modified core unit.

In addition, the cube ends of the rods need not be in a flat plane but may be curved, as shown in FIG. 26.

It has been found that reflectors made in accordance with the invention easily meet the standards of Class A reflective brilliance of the Society of Automotive Engineers.

We claim:

1. The method of making a core for molding a reflector having a high degree of optical quality which comprises assembling a plurality of accurately formed rods with shaped ends in a bundle with the shaped ends aligned into a facet for molding, mechanically clamping said rods at an area remote from said shaped ends, mechanically clamping said rods at an area longitudinally spaced from said first area of clamping and adjacent said shaped ends, severing the clamped rods at an area between said two clamped areas, fusion welding the severed ends of the portions of the rods having the shaped ends while simultaneously applying a coolant to said shaped ends, continuously maintaining the mechanical clamping pressure during said fusion welding to thereby form a unitary welded rod cluster unit, stress relieving said unitary rod unit while maintaining the mechanical clamping, forming each rod unit with an accurate surface opposite the molding surface formed by the shaped ends of the rods, beveling the side surfaces of said rod unit in a direction radially inwardly from the cube ends toward the other ends of said rods at an acute angle to the axis of said rods, mounting a plurality of said rod units on a support in rigid position with the side edges of the rod units in abutting relationship at the areas of the shaped ends of the rods.

2. The method set forth in claim 1 wherein said coolant comprises a liquid.

3. The method set forth in claim 1 including the step of welding said unitary mold units on said support.

4. The method set forth in claim 1 including the step of conducting said fusion welding in an inert atmosphere.

5. The method set forth in claim 1 including the steps of forming a threaded opening in each said unitary rod unit in a direction generally parallel to the axis of said rods, fusion welding the base of the opening formed in each said rod unit while simultaneously applying coolant to the shaped ends of the rods, and assembling said rod units to said support by drawing said rod units axially through the action of said threads.

6. The method set forth in claim 5 including the step of fusion welding the base of said opening in an inert atmosphere.

7. The method of making a core for molding a reflector having a high degree of optical quality which comprises assembling a plurality of accurately formed hexagonal rods with cube ends in a bundle with the cube ends aligned into a facet for molding, mechanically clamping said rods into a cluster at an area remote from said cube ends, mechanically clamping said rods at an area longitudinally spaced from said first area of clamping and adjacent said cube ends, severing the clamped rods at an area between said two clamped areas, fusion welding the severed ends of the portions of the rods having the cube ends in an inert atmosphere while simultaneously applying a liquid coolant to said cube ends, continuously maintaining the mechanical clamping pressure to thereby form a unitary welded rod cluster unit, stress relieving said unitary rod unit, forming each rod unit with an accurate planar surface opposite the molding surface formed by the cube ends of the rods, beveling the side surfaces of said rod unit in a direction radially inwardly from the cube ends toward the other ends of said rods at an acute angle to the axis of said rods, mounting a plurality of said rod units on a support in rigid position with the side edges of the rod units in abutting relationship at the areas of the shaped ends of the rods.

8. The method set forth in claim 7 including the step of welding said unitary mold units on said support.

9. The method set forth in claim 7 including the steps of forming a threaded opening in each said unitary rod unit in a direction generally parallel to the axis of said rods, fusion welding the base of the opening formed in each said mold unit in an inert atmosphere while simultaneously applying liquid coolant to the cube ends of the rods, and assembling said rod units to said support by drawing said rod units axially through the action of said threads.

10. The method of making a core for molding a reflector having a high degree of optical quality which comprises, assembling a plurality of accurately formed hexagonal rods with cube ends in a bundle with the cube ends aligned into a facet to form a core face, mechanically clamping said rods at an area remote from said cube ends, mechanically clamping said rods at an area longitudinally spaced from said first area of clamping and adjacent said cube ends, severing the clamped bundle at an area between said two clamped areas, fusion welding the severed ends of the portions of the rods having the cube ends in an inert atmosphere while simultaneously applying a liquid coolant to said cube ends, continuously maintaining the mechanical clamping pressure to thereby form a unitary rod core unit, stress relieving said unitary rod unit, forming each rod unit with an accurate surface opposite the molding surface formed by the cube ends of the rods, beveling the side surfaces of said rod unit in a direction radially inwardly from the cube ends toward the other ends of said rods at an acute angle to the axis of said rods.

11. The method set forth in claim 10 including the step of welding a plurality of said unitary core units on a support with the bevelled side edges in abutting relation adjacent the cube ends of said rods.

12. The method set forth in claim 11 including the steps of forming a thread in each said unitary core unit in a direction generally parallel to the axis of said rods, fusion welding the base of the opening formed in each said rod unit in an inert atmosphere while simultaneously applying liquid coolant to the cube ends of the rods, and assembling said rod units to a support by drawing said mold units axially through the action of said threads.

13. The method of making a core for molding a reflector having a high degree of optical quality which comprises assembling a plurality of accurately formed hexagonal rods with shaped ends in a bundle with the shaped ends aligned into a facet to form a core face, mechanically clamping said rods at an area remote from said shaped ends, mechanically clamping said rods at an area longitudinally spaced from said first area of clamping and adjacent said shaped ends, severing the clamped bundle at an area between said two clamped areas, fusion welding the severed ends of the portions of the rods having the shaped ends while simultaneously applying a coolant to said shaped ends, continuously maintaining the mechanical clamping pressure during said fusion welding to thereby form a unitary rod core unit, stress relieving said rod unit, forming said rod unit with an accurate surface opposite the molding surface formed by the shaped ends of the rods.

14. The method set forth in claim 13 including the steps of beveling the side surfaces of a plurality of said rod units in a direction radially inwardly from the shaped ends toward the other ends of said rods at an acute angle to the axis of said rods and welding a plurality of said unitary core units on a support with the bevelled side edges in abutting relation adjacent the cube ends of said rods.

15. The method set forth in claim 14 including the steps of forming a thread in each said unitary core unit in a direction generally parallel to the axis of said rods, fusion welding the base of the opening formed in each said rod unit while simultaneously applying coolant to the shaped ends of the rods, and assembling said rod units to a support by drawing said mold units axially through the action of said threads.

16. The method of making a core for molding a reflector having a high degree of optical quality which comprises assembling a plurality of accurately formed rods with shaped ends in a bundle with the shaped ends aligned into a facet for molding, mechanically clamping the rods at an area adjacent the shaped ends, fusion welding the ends of the rods opposite the shaped ends while simultaneously applying a coolant to the shaped ends, continuously maintaining the mechanical clamping pressure during said fusion welding to thereby form a unitary welded rod unit, forming said rod unit with an accurate surface opposite the molding surface formed by the shaped ends of the rods, and assembling said unit on a support to form a mold core.

17. The method set forth in claim 16 including the step of stress relieving said rod unit.

References Cited by the Examiner

UNITED STATES PATENTS

| | | | |
|---|---|---|---|
| 716,287 | 12/1902 | Schippers | 18—44 |
| 1,591,572 | 7/1926 | Stimson. | |
| 1,897,893 | 2/1933 | Evans | 18—44 |
| 1,906,655 | 5/1933 | Stimson. | |
| 2,432,668 | 12/1947 | Kingston | 264—1 |
| 2,464,738 | 3/1949 | White et al. | 264—1 |
| 2,572,772 | 10/1951 | Skoog | 156—296 |
| 2,791,938 | 5/1957 | Doolittle et al. | 88—78 |
| 2,884,835 | 5/1959 | Rupert | 88—78 |
| 3,119,678 | 1/1964 | Bazinet | 156—296 |

FOREIGN PATENTS 1,310,591  10/1962  France.

ALEXANDER H. BRODMERKEL, *Primary Examiner.*

JOHN K. CORBIN, *Examiner.*

R. STERN, B. SNYDER, *Assistant Examiners.*